June 29, 1926.

G. H. GILMAN

TRACTION MECHANISM

Filed July 31, 1920

Inventor:
George H. Gilman
by Emery, Booth, Janney & Varney Attys

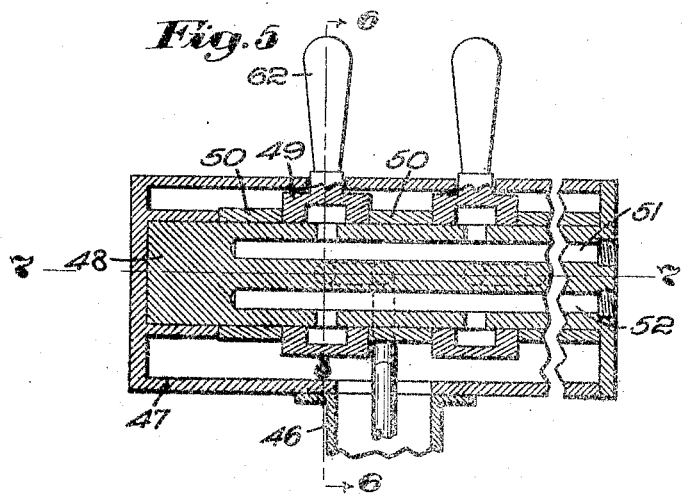
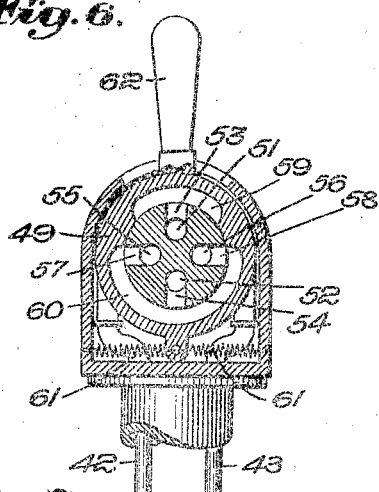
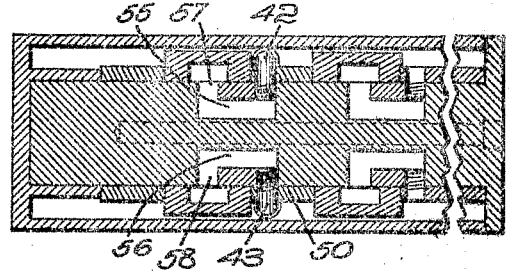

Patented June 29, 1926.

1,590,238

UNITED STATES PATENT OFFICE.

GEORGE H. GILMAN, OF BOSTON, MASSACHUSETTS.

TRACTION MECHANISM.

Application filed July 31, 1920. Serial No. 400,496.

My invention relates to gearing and particularly but not exclusively to a reversible reduction gearing for driving wheeled vehicles.

My invention will be best understood from the following drawings and description of one specific embodiment of my invention submitted for illustrative purposes, while its scope will be more particularly pointed out in the appended claims.

Figure 1:
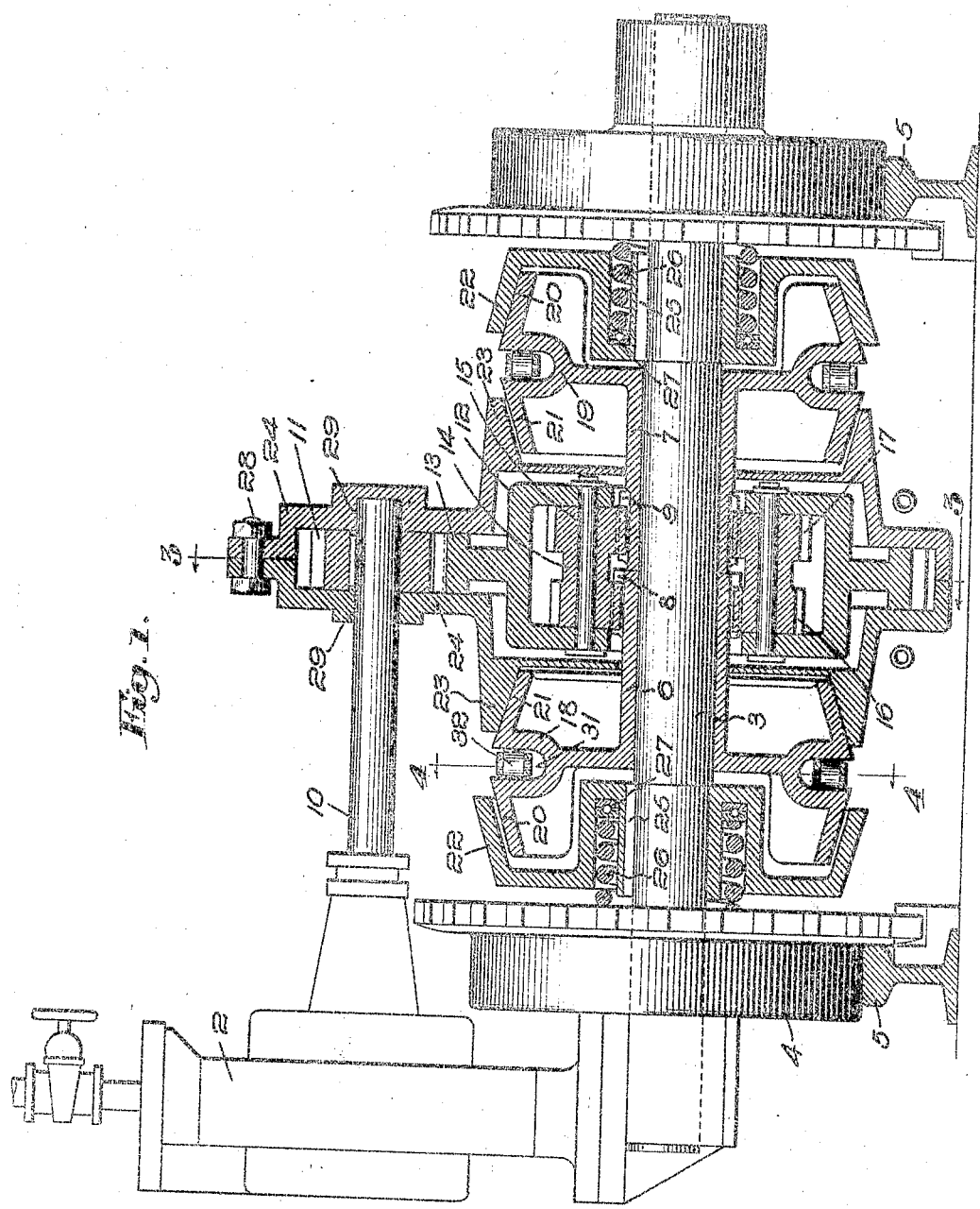
Figure 1 shows an elevation of the submitted embodiment of my invention, parts being shown in section.
Figure 2:
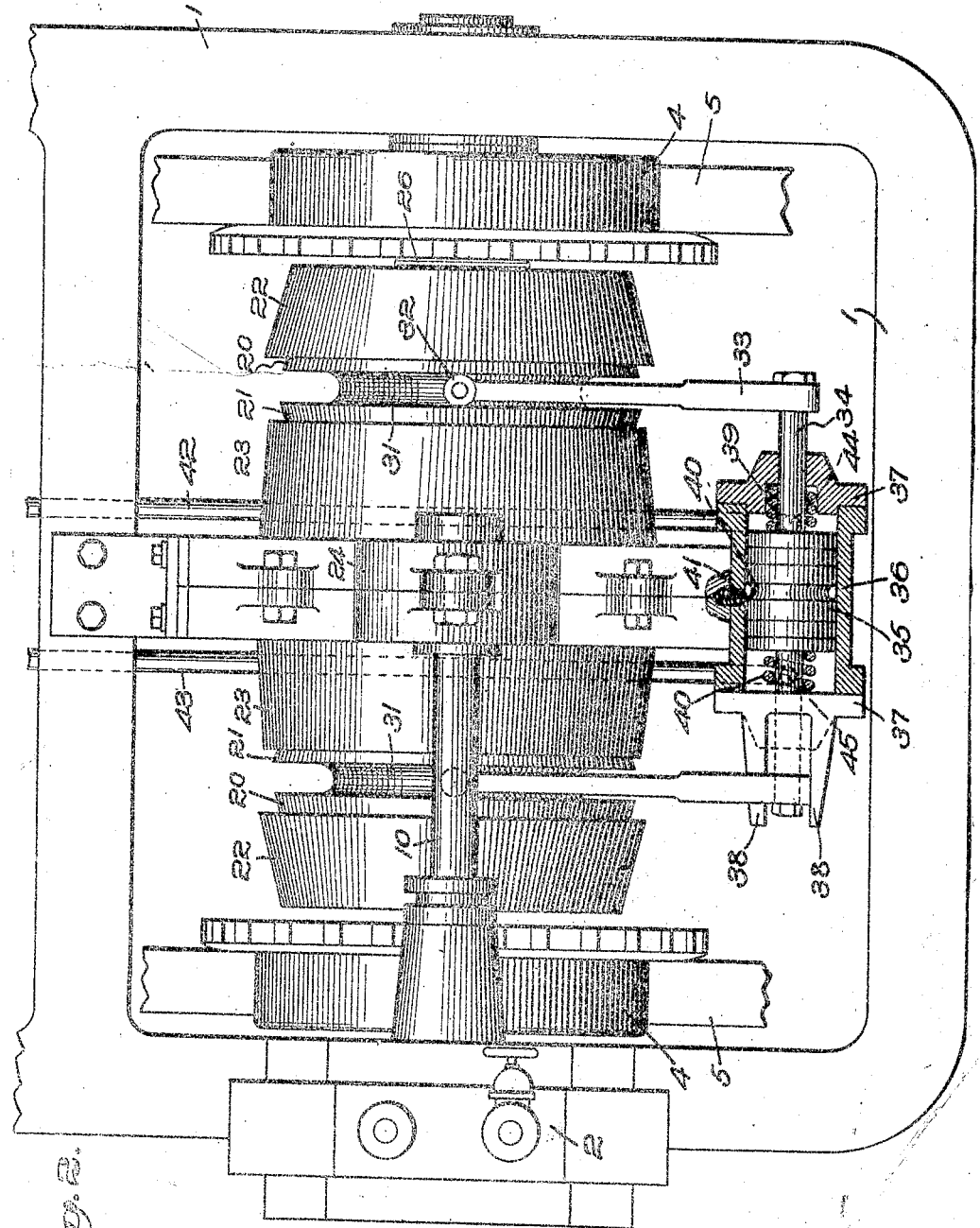
Fig. 2 is a plan of the submitted embodiment of my invention.
Figure 3:
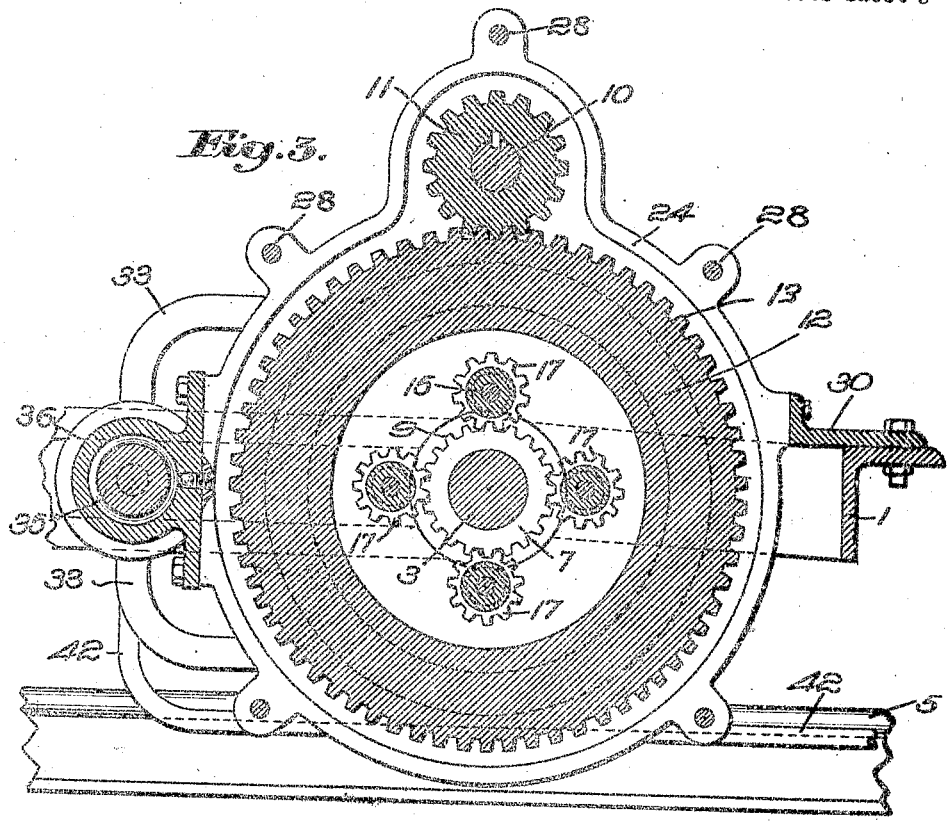
Figure 4:
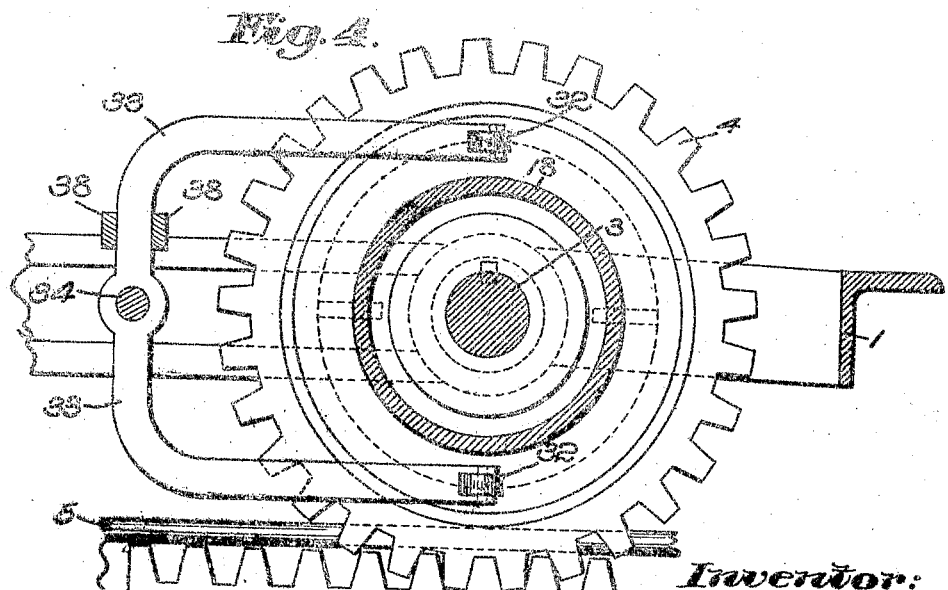

Figs. 3 and 4 respectively are sections on the lines 3—3 and 4—4 of Fig. 1.

Fig. 5 is a section through the controlling valve.

Fig. 6 is a section on the line 6—6 of Fig. 5; and

Fig. 7 is a section on the line 7—7 of Fig. 5.

Referring to the drawings, I have shown part of the frame 1 of a mucking machine, which frame carries a propelling motor 2 and has journalled thereon an axle or shaft 3 for the drivers 4 adapted to rest upon and roll along the rails 5. Slidably carried by the shaft are the sleeves 6 and 7, the adjacent portions of the sleeves fixedly carrying the toothed gears 8 and 9. From the motor extends the driving shaft 10 which I have shown provided with a suitable pinion 11. This pinion I connect to the sleeves by means of differential gearing which in the submitted embodiment of my invention is of the planetary type. For this purpose I provide a gear carrier member 12 having formed on its periphery a toothed gear portion 13 in mesh with the teeth of the pinion, and carried by this member are a plurality of planetary members 14 rotatably supported on the carrier by means of spindles 15. The members 14 are provided with gear portions 16 and 17 respectively in mesh with the gears 8 and 9 of the sleeves. It will be observed that in the submitted embodiment of my invention the gears 16 and 17 provide a support for the carrier permitting it to rotate concentrically with the shaft 3.

The gear set formed by the gears 8 and 16 and that formed by the gears 9 and 17, are of different ratio, the relative ratios depending upon the total ratio of reduction desired between the driving shaft 10 and the driven shaft 3, which ratio of reduction will be dependent upon the speed of the motor 2 and the nature of the vehicle to which the gear is applied. For a mucking machine this difference in ratio may be, for example, that resulting from a difference in one tooth between the gears 8 and 9.

In order to cause the reduction gear to operate, I provide means for holding either of the gears 8 and 9 stationary and for connecting the other gear in each case to the shaft 3. For this purpose I have illustrated the sleeves 6 and 7 as provided with the double acting clutch members 18 and 19, each of which is provided with the oppositely opposed conical clutch elements 20 and 21. The clutch elements 20 are adapted to be moved into engagement with clutch elements 22 carried by the shaft and the clutch elements 21 into engagement with the stationary clutch elements 23, the latter of which I have shown formed integrally with the halves 24 of the gear casing. Although I have shown the clutch members 18 and 19 formed integrally with the sleeves 6 and 7, under which conditions the sleeves slide along the shaft when the clutch members are moved, it will be understood that the clutch members may be otherwise secured in driving relation to the sleeves. It is to be also understood that although I have shown for purposes of illustration conical friction clutches, other forms of friction clutches or positive clutches may be substituted therefor. To permit one sleeve or its associated clutch elements to move a greater distance than the other in order to compensate for inaccuracies of manufacture and for providing for a better operation of the clutch elements, I mount one or more of the latter resiliently, and to this end in the submitted embodiment of my invention, I have shown the clutch elements 22 splined to the shaft 3 by means of keys 25 and resiliently positioned with relation to the shaft by means of springs 26. For permitting relative rotation between the springs and the clutch elements I have shown the anti-friction thrust bearings 27 carried by the clutch elements.

The gear casing as hereinbefore set forth is made in two halves or sections 24. These sections are secured together by bolts 28. The casing provides bearings 29 for the shaft 10 and is prevented from rotating and is supported by any suitable means herein conventionally illustrated by the bracket 30 which connects the casing to the frame 1.

The operation of parts of my device so far described is as follows:

The motor 2 may be run continuously, and under this condition, when the drivers 4 are to remain stationary, both clutch members 18 and 19 are so positioned that both pairs of clutch elements 20 and 21 are out of engagement with the respective clutch elements 22 and 23. If it is desired to move the vehicle forwardly, the clutch members 18 and 19 are slid to position shown by Fig. 1 to bring the clutch elemnt 21 of the clutch member 18 into engagement with the fixed clutch element 23 and to bring the clutch element 20 of the clutch member 19 into engagement with the left hand clutch element 22 carried by the shaft. Under these conditions, the gear 8 cannot rotate and the gear 9 is fixed to the shaft 3, consequently as the carrier 12 is being revolved around the shaft by the motor, the gear 9 revolves, its speed of revolution depending upon the difference between the respective gear ratios of gear sets 8—16 and 9—17. If it is desired to drive the vehicle backwards, the clutch members 18 and 19 are moved to the left as viewed in Fig. 1 in order to connect the gear 8 with the shaft and to hold the gear 9 from turning. Under these conditions, the shaft 3 is revolved in the opposite direction to that in which it is revolved with the parts in the position shown by Fig. 1, and if the difference in the ratios of the gear sets afforded by the gears 8—16 and 9—17 is but slight, the forward and backward speeds are substantially equal. It is of course to be understood that I have used the terms "forward" and "backward" in their relative sense and whether the vehicle in any given extreme position of the clutches moves forwardly or backwardly depends on the direction of rotation of the motor.

For operating the clutch members 18 and 19 I have shown each provided with a groove 31 which receives the anti-friction rollers 32 carried by the ends of the forks 33. For operating the forks I connect the same respectively to opposite ends of the piston rod 34 of the piston 35 reciprocably mounted in the cylinder 36 carried by the housing. The cylinder 36 is provided with opposite heads 37 through which the rods 34 extend and carried by the heads are guide members 38 which cooperate with the upstanding portions of the forks to prevent turning of the same. Surrounding the rods and abutting the cylinder heads and the adjacent ends of the piston are springs 39 which normally exert equal and opposite forces to hold the piston in its central position, under which conditions the clutch elements of neither the clutch members 18 nor 19 are in engagement with the other clutch elements. For insuring that the piston will come to rest in its central position, I provide a lock which in the submitted embodiment of my invention takes the form of a groove 40 formed on the exterior surface of the piston and a cooperating spring-pressed ball 41 carried by the cylinder. In an obvious manner, when the piston moves to its central position, in which position the resultant force exerted by the oppositely acting springs 39 and 40 is negligible, the ball will be snapped into the groove and thus cause the piston to come to rest and be yieldingly held at its central position.

The piston I operate by means of fluid pressure and for this purpose I provide a valve adapted to admit high pressure air into either of the pipes 42 or 43, the latter respectively communicating with the opposite cylinder ends through ports 44 and 45. Preferably, the valve is so formed as normally to maintain both ends of the cylinder in connection with the atmosphere or other place of low pressure, and is so formed that when high pressure air is admitted to either cylinder end by way of the pipe 42 or 43, the opposite end is maintained in communication with the place of low pressure in order that the piston may move.

Referring to Figs. 5, 6 and 7 I have shown mounted in convenient relation to the operator a standard 46 which carries a casing 47. Extending through this casing is an arbor 48 which carries the valves for operating the instrumentalities of the machine. The valve for operating the clutch is shown at 49, and is mounted to turn on the arbor and held in position relatively to the length of the arbor by suitable spacing sleeves 50. Other valves carried by the arbor are unnecessary to describe in this application as their specific details form no part of the present invention.

Extending through the arbor mentioned above is a passage 51 to which is connected a source of compressed air or other motive fluid and diametrically opposite to this passage is formed a second passage 52, in constant communication with the atmosphere or other place of low pressure. Extending through the arbor from the passages 51 and 52 to the exterior surface thereof within the confines of the valve 49 are the respective passages 53 and 54. Formed in the arbor intermediate the passages 51 and 52 are passages 55 and 56, which respectively connect at one end thereof with the pipes 42 and 43 leading to the clutch operating cylinder and at the other end open by means of ports 57 and 58 to the exterior surface of the arbor in the same plane as the passages 53 and 54. The valve has formed on its interior surface in the same plane as the passages 57 and 58 arcuate grooves 59 and 60. For holding the valve normally in the position shown by Fig. 7 are the oppositely acting springs 61 and for turning the valve is provided a handle 62.

In the normal position of the valve illustrated by Fig. 6 each end of the cylinder is connected to the place of low pressure by way of the pipes 42 and 43, passages 55 and 56, the arcuate groove 60 and the passages 54 and 52. When the valve is turned in either direction from its position shown by Fig. 6, one of the passages 57 and 58 is maintained in communication with the place of low pressure, while such communication of the other passage is interrupted and the latter is connected to the source of compressed air by means of the groove 59 and passages 53 and 51.

It will be understood that I am not limited to the example of the invention herein described, but that wide deviations may be made therefrom without departing from the spirit of the invention.

Claims:

1. A shaft, a pair of gears coaxial therewith, a driving member, differential gearing connecting each of said gears to said driving member, said gearing comprising a planetary gear carrier surrounding said pair of gears and being supported thereby, a housing for said gear carrier; clutch elements carried by said housing, by said shaft and by each of said pair of gears, those of the last named being adapted to engage those of either of the two first named; and means for shifting said clutch elements carried by the gears in the same direction to cause either of the gears of said pair to be connected to the housing and the other in each case to the shaft.

2. In a gearing, a driving member, a driven member, a pair of aligned gears, a plurality of spaced gears in mesh with each of said aligned gears, said spaced gears in pairs rotating in unison and providing with said aligned gears gear sets of different ratio, a carrier for said spaced gears supported by such gears on said aligned gears and concentrically with the latter, means connecting said carrier to said driving member, and means for preventing rotation of either of said aligned gears and for connecting the other in each case to drive said driven member.

3. A shaft, a pair of gears coaxial therewith, a driving member, differential gearing connecting each of said gears to said driving member, said gearing comprising a planetary gear carrier surrounding said pair of gears and supported thereby, a housing for said gear carrier, said housing holding said carrier from displacement longitudinally of said shaft; clutch elements carried by said housing, by said shaft and by each of said pair of gears, those of the last named being adapted to engage those of either of the two first named; and means for operating said clutch elements to cause either of the gears of said pair to be connected to said housing and the other in each case to said shaft.

4. A shaft; sleeves slidably and rotatably mounted on said shaft; gears carried by said sleeves at their adjacent ends; planetary gear members meshing with the gears on said sleeves; a carrier for said planetary gears having openings through which said sleeves project; a casing for said carrier; clutch elements carried by said casing, said shaft, and said sleeves; and means for simultaneously sliding said sleeves to clutch one to said shaft and the other to said casing.

5. A shaft; sleeves slidably and rotatably mounted on said shaft; gears carried by said sleeves at their adjacent ends; planetary gear members meshing with the gears on said sleeves; a carrier for said planetary gears having openings of larger diameter than said sleeves and through which said sleeves project; a casing for said carrier; clutch elements carried by said casing, said shaft, and said sleeves; and means for simultaneously sliding said sleeves to clutch one to said shaft and the other to said casing.

6. A shaft, a pair of gears surrounding said shaft, differential gearing connecting a common driver to said gears, a housing for said gearing surrounding said shaft and provided with clutch elements facing in opposite directions, clutch elements carried by said shaft adjacent to the clutch elements of said housing and facing toward such elements, double acting clutch elements between each pair of clutch elements so formed, means connecting said elements to said pair of gears, means splining the clutch elements carried by the shaft thereto for yielding movement longitudinally of said shaft, and means for moving the double acting clutch elements into and out of engagement with the other clutch elements.

7. The combination with a gearing mechanism having three positions, of operating means therefor having like positions, said operating means comprising an expansible chamber fluid motor device having a movable wall, means for exerting equal and opposite forces to hold said wall in an intermediate position, fluid pressure means for amplifying either of said forces to overcome the other, whereby to cause movement of said wall, and means for engaging said wall for locking it in position.

8. The combination with a gearing mechanism having three positions, of operating means therefor having like positions, said operating means comprising an expansible chamber fluid motor device having a movable wall, means for normally holding said wall in one position, fluid pressure controlling means for causing by the action of fluid pressure movement of said wall to either of the other positions, and automatic locking means for directly engaging said wall for insuring stoppage of said wall in its normal position.

9. The combination with a gearing mechanism having three positions, of operating mechanism therefor, said operating mechanism comprising a relatively movable cylinder and piston, a plurality of means normally holding said cylinder and piston in an intermediate position relatively to each other, a source of fluid pressure, a valve mechanism, and connections controlled by said valve mechanism for normally exhausting both ends of said cylinder and operative to connect said source of fluid pressure to either end of said cylinder while maintaining the exhaust for the other end.

10. The combination with a gearing mechanism having three positions, of operating mechanism therefor, said operating mechanism comprising a relatively movable cylinder and piston, means normally holding said cylinder and piston in an intermediate position relatively to each other, means for insuring stoppage in such intermediate position, a source of fluid pressure, a valve mechanism, and connections controlled by said valve mechanism for normally exhausting both ends of said cylinder and operative to connect said source of fluid pressure to either end of said cylinder while maintaining the exhaust for the other end.

11. The combination with a gearing mechanism having spaced double acting clutches of a cylinder and piston, rods extending from opposite sides of said piston and connected to said spaced clutches, means surrounding said rods for normally holding said piston at a predetermined position in said cylinder, and means for causing a pressure difference on opposite sides of said piston for moving it.

12. The combination with a gearing mechanism of a cylinder and piston, rods extending from opposite sides of said piston and connected to said gearing, means surrounding said rods for normally holding said piston at a predetermined position in said cylinder, other means for insuring stoppage of said piston at said predetermined position, means for causing a pressure difference on opposite sides of said piston for moving it, and means for connecting both ends of said cylinder simultaneously to the atmosphere for causing said piston to assume its predetermined position.

13. A power cylinder having a piston, spring means for holding said piston in a predetermined portion of said cylinder, and a non-positive lock for engaging said piston in such position.

14. A power cylinder for changing gearing, a piston therein, locking means for engaging the exterior of said piston when the latter is in a predetermined position in said cylinder, and fluid pressure controlling means for releasing said locking means.

15. A power cylinder for changing gearing, a piston therein, locking means for engaging the exterior of said piston when the latter is in a predetermined position in said cylinder, and fluid pressure controlling means for releasing said locking means and causing relative motion of said cylinder and piston.

16. In gear changing mechanism, a cylinder, a piston therein, springs within said cylinder and acting on opposite sides of said piston for holding it in an intermediate position, means normally connecting each end of said cylinder to the atmosphere and for maintaining such connection and contemporaneously connecting the opposite side to a source of pressure fluid.

In testimony whereof, I have signed my name to this specification.

GEORGE H. GILMAN.